Aug. 9, 1927.
A. J. ALLARD
1,638,429
MOTOR VEHICLE DIRECTION INDICATOR
Filed July 2, 1924   2 Sheets-Sheet 2
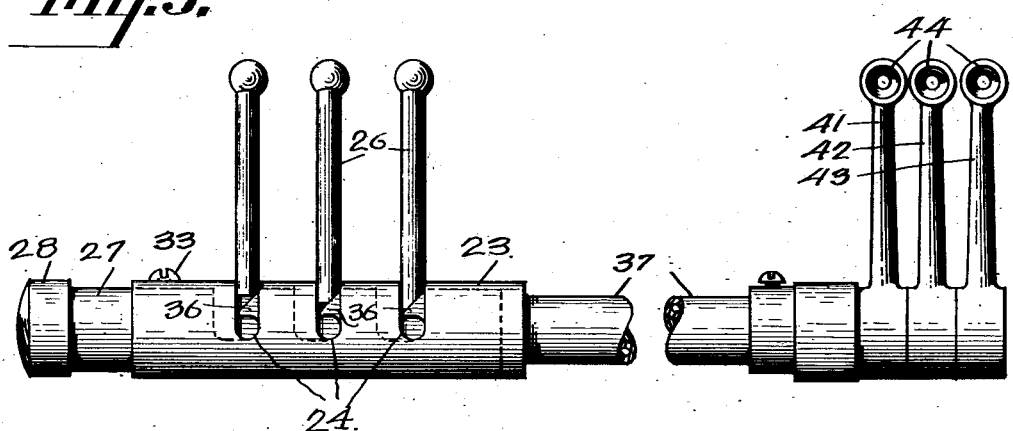
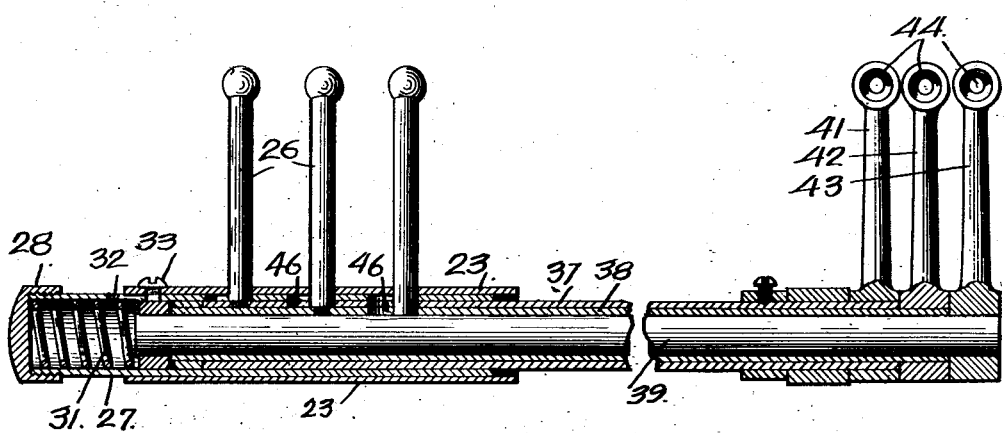
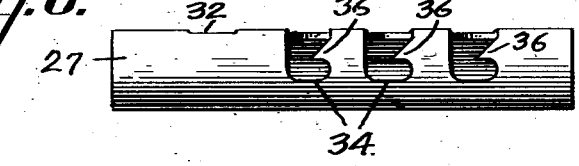
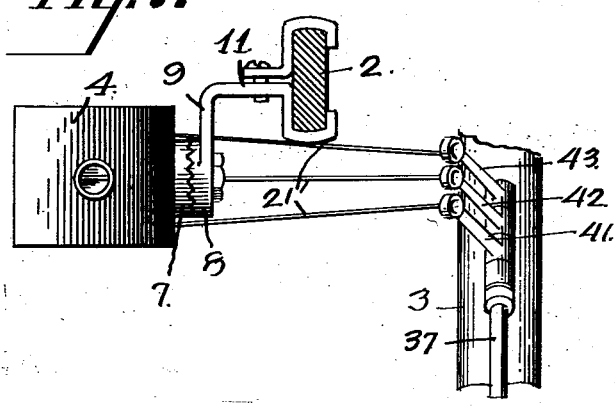
INVENTOR
Alfred J Allard
BY Arthur L Slee
ATTY.

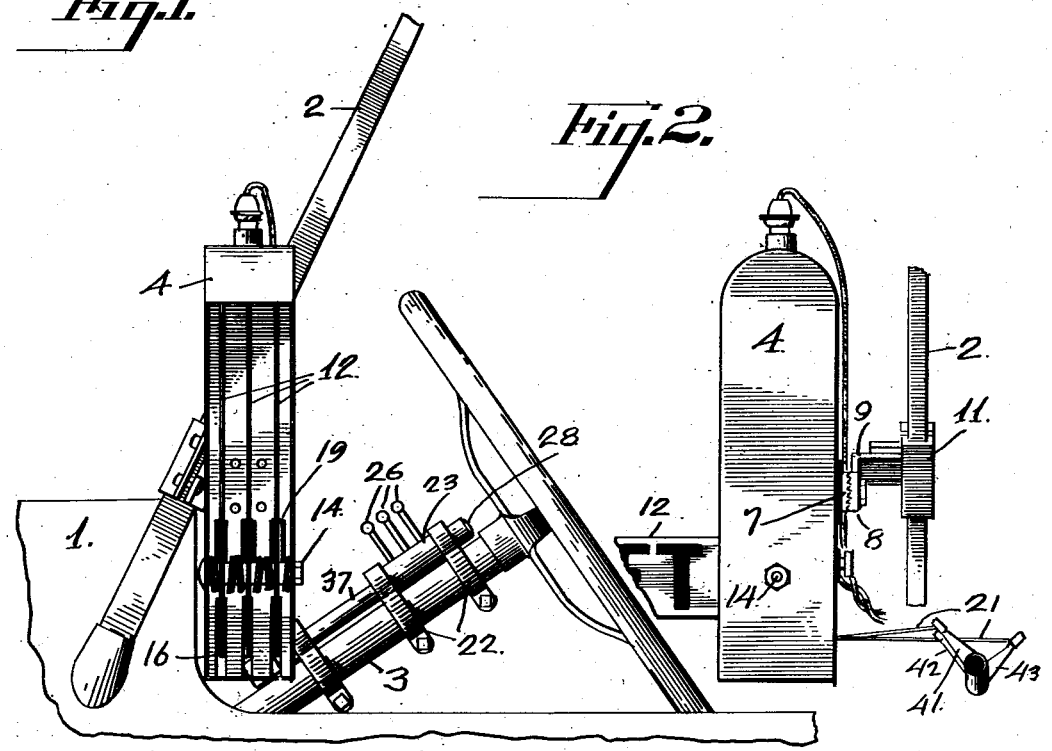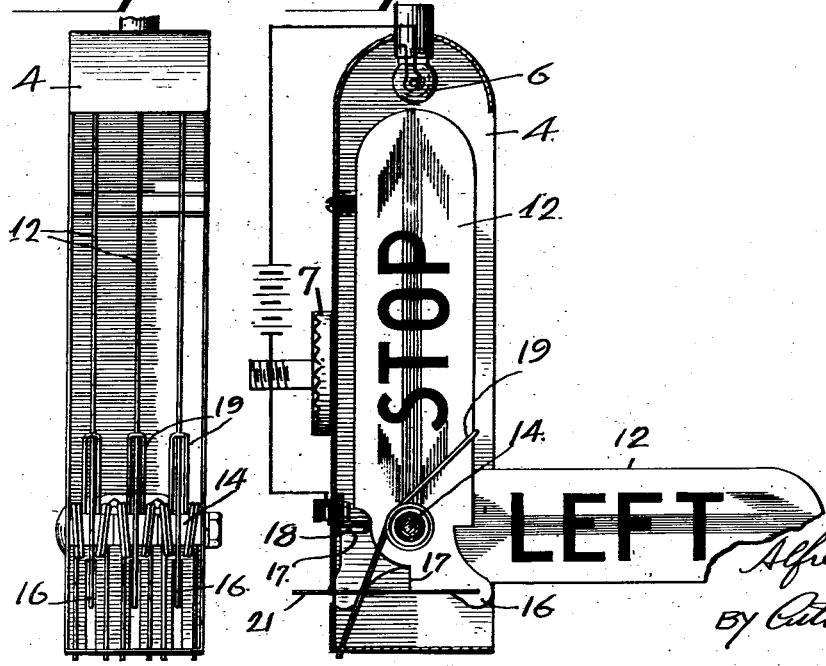

Patented Aug. 9, 1927.

1,638,429

UNITED STATES PATENT OFFICE.

ALFRED J. ALLARD, OF ELDRIDGE, CALIFORNIA.

MOTOR-VEHICLE DIRECTION INDICATOR.

Application filed July 2, 1924. Serial No. 723,797.

My invention relates to improvements in a direction indicator for motor vehicles wherein any one of a plurality of pivotally mounted direction signals are moved and locked into an extended operative position by a plurality of nested sleeves operating in conjunction with a releasing tube, said sleeves and releasing tube being arranged at a convenient point for operation by an operator of the vehicle.

The primary object of the present invention is to provide a new and improved motor vehicle direction indicator.

Another object of this invention is to provide a new and improved motor vehicle direction indicator arranged to easily and quickly extend into a conspicuous operative position a direction or other signal to indicate the intention of the operator of said vehicle.

A further object is to provide a plurality of motor vehicle signals arranged to automatically actuate a suitable illuminating means when any one of said signals is projected or extended to an operative or indicating position.

A still further object of the device is to provide a new and improved means for moving and locking any signal into an operative position, said means also constituting a means for automatically releasing an extended signal when a new signal is moved into operative position.

A further object is to provide a new and improved vehicle direction indicator having a few simple and inexpensive parts, one that may be easily and readily attached to present standard types of motor vehicles at present in use without tapping or boring holes or making any alterations in the vehicle itself.

It is also an object to provide a device of the character set forth wherein a plurality of pivotally mounted signals may be adjustably mounted upon the side of a motor vehicle, and preferably on the left windshield standard and on the operator's side of the vehicle where it may be readily discernible by the operator as well as by approaching vehicles and others.

It is also an object to provide an improved device of the type described wherein the operating and releasing means therefore may also be readily and easily attached without in any manner altering the vehicle and which may be easily and conveniently actuated to set or release a signal.

I accomplish these and other objects by means of the improved device disclosed in the drawings forming a part of the present specification wherein like characters of reference are used to designate similar parts throughout the said specification and drawings, and in which—

Fig. 1 is a broken side elevation of a portion of a motor vehicle disclosing my improved direction indicator attached thereto;

Fig. 2 is a broken right hand elevation of the device disclosed in Fig. 1, and also showing a portion of the windshield standard, and a portion of the actuating and releasing means therefor;

Fig. 3 is an enlarged front elevation of the device removed from the vehicle;

Fig. 4 is a vertical sectional view of the device, showing one of the signals extended to an operative position;

Fig. 5 is an enlarged broken detailed view of the controlling and releasing device detached from the steering post;

Fig. 6 is a broken vertical sectional view of the same disclosing the manner in which the parts are assembled;

Fig. 7 is a broken plan view of the device; and

Fig. 8 is a detailed view of the locking and releasing sleeve.

Referring to the drawings the numeral 1 is used to designate in general a portion of a motor vehicle having the usual wind-shield standard 2 and steering post 3.

A suitable housing 4 having one side open and a single contact lamp 6 in the top thereof is adjustably mounted upon the windshield standard 2 by means of a radially serrated or corrugated plate 7 mounted upon the rear side thereof and held in engaging relation with a similar plate 8 forming a lateral extension with a suitable bracket 9 provided with a clamp 11 arranged to engage the windshield standard 2 of the motor vehicle 1.

The lateral extension 8 of the bracket 9 provides a means whereby the housing 4 may be offset from the windshield standard 2 in order to bring the housing 4 within or back of said windshield when vertical and the adjustable serrated plates 7 and 8 are adjustably and rotatably connected whereby the said housing may be adjusted to a vertical position when the windshield is slanted, as disclosed in Fig. 1 of the drawings, in order to facilitate operation of the connections, hereinafter more fully set forth, between the signals in the housing 4 and the actuating or controlling means therefor.

Within the housing 4 are a plurality of suitable signals 12 pivotally mounted upon a horizontal bearing 14 extending across the lower portion of the housing 4. Each signal 12 is independently mounted and is provided with an arm 16, the purpose of which will hereinafter be more fully described, and a projection 17 formed integral therewith and arranged, when said signal is extended or moved to an operative position, to form contact with a lateral bracket 18 which is secured to and insulated from the back portion of the housing 4 and extends laterally to engage any of the projections 18 on any of the signals 12 when so extended, whereby a circuit may be closed through the lamp 6 in the top of the housing 4.

A separate spring member 19 is provided for each signal 12 to normally retain the same upright or in an inoperative position within the housing 4. Connected to each arm 16 of each signal 12 is a suitable wire, or rod 21.

Mounted upon the steering post 3 of the vehicle 1, by means of suitable straps or clamps 22, is a tubular housing 23 provided with parallel lateral slots 24 through which extend the operating levers 26. Slidably mounted within the tubular housing 23 is a releasing sleeve 27 extending slightly beyond one end of said housing 23 and provided with a cap 28, to enclose a spring 31 arranged to normally retain said releasing sleeve in a locking position. The sleeve 27 is provided with a longitudinally disposed slot 32 which engages a suitable screw pin 33 which is mounted within one end of the tubular housing 23 and permits longitudinal sliding movement of the sleeve but prevents rotation of the same, the purpose of which will hereinafter be more fully set forth. The releasing sleeve 27 is further provided with preferably three lateral slots 34 having projections 36 arranged to engage and hold the levers 26 when any one of them is moved past its projection 36, said projection being moved away from the lever 26 by the action of said lever against the inclined edge of said projection, as disclosed in Figs. 5 and 8 of the drawings, said projection 36 being moved directly across the path of said lever by the action of the tension of the spring 31, said sleeve being prevented from rotating during the pressure of the lever 26 against said projection 36 by the screw 33 in the tubular member 23 which engages the longitudinally disposed slot 32 in said releasing sleeve 27.

Rotatably mounted within the releasing sleeve 27 are a plurality of nested tubes 37, 38 and 39 respectively, which each carry one of the operating levers 26 adjacent one end while at their other ends each one of said tubes is provided with the levers 41, 42 and 43 respectively, said levers having apertured ends 44 within which are suitably secured the ends of the rods 21 which extend from the arms 16 of the direction signals 12.

The tubes 37, 38 and 39 are slotted and apertured as at 46 in order to permit their rotation and the movement of levers 26 attached to the other tubes without interference between levers 26 and tubes.

The signals 12 are provided with suitably coloured indices for indicating the direction or intention of the operator of the vehicle and these signals bear the same characters on both sides thereof in order that a single set of signals may suffice for warnings from in front as well as the rear of the machine.

Normally the signals 12 are held in a vertical or inoperative position within the housing 4 by the springs 19. When it is desired to move and lock one of the signals 12 into an extended operative position the lever 26 on the steering post mechanism which corresponds to the signal to be so actuated is moved through an arc of approximately ninety degrees which will first cause the said lever 26 to impinge against the inclined edge of the projection 36 of the releasing sleeve 27 and move said sleeve with all its projections 36 away from the path of said lever 26 and against the tension of the spring 31 until said lever 26 reaches the extreme end of the slot 24 in the housing 23 when the tension of the said spring 31 will move the corresponding projection 36 in behind said actuated lever 26 and lock the same in position. As the lever 26 is being moved to such position it in turn rotates its respective tube 37, 38, or 39, as the case may be, which in turn will actuate the lever 41, 42 or 43 and in turn exert a pull upon the proper rod 21 attached to the arm 16 of the signal 12 and move and extend said signal into an extended operative position in order that it may be clearly discernible from the front and rear of the vehicle, as the signal 12 is moved to such position the projection 17 formed integral therewith will contact with the insulated lateral bracket 18 and thereby close an electrical circuit through the lamp 6, as diagrammatically disclosed in Fig. 4 of the drawings.

Should the wrong signal inadvertently or otherwise be extended to an operative position, or if, for any reason, it is desired to release the extended signal or to extend another signal in place thereof it my be accomplished in two ways. First, by moving the lever 26 of the desired signal said lever 26 will press against the inclined edge of its respective projection 36 of the releasing sleeve 27 and in removing said projection from its path as it proceeds will similarly remove the projection from the path of the previously locked lever 26 and thereby liberate the same when it will, with its respective signal, be returned to normal or inoperative position.

Or, by simply pressing upon the cap 28 against the tension of the spring 31 and pushing said cap and its releasing sleeve 27 inwardly all of the projections 36 will be moved or receded to release any or all locked levers 26 when said levers 26 will be automatically returned to inoperative positions by the tensions of the springs 19 which normally retain the signals 12 in an inoperative position within the housing 4.

It is obvious that this device may be readily attached to any open type of motor vehicle without making any alterations on said vehicle. It is also obvious that said signals may be easily, quickly and economically extended to an operative position, with the least possible expenditure of energy. It is convenient of operation as the controlling or actuating, locking and releasing mechanism are all incorporated within the nested tubes which are conveniently located, and easily attached, to the steering post.

Having thus described my invention what I claim as new and desire to secure by Letters Patent is:—

1. In a vehicle direction indicator, a plurality of nested actuating sleeves, each connected to a corresponding signal for actuating the same; a locking sleeve mounted around the actuating sleeves; operating levers connected to each sleeve and extending outwardly through slots formed in the surrounding sleeves for independently rotating said sleeves to actuate a desired signal; and means formed upon the locking sleeve to engage the operating levers, whereby the signal may be held in signaling position.

2. In a vehicle direction indicator, a plurality of nested actuating sleeves, each connected to a corresponding signal for actuating the same; a locking sleeve mounted around the actuating sleeves; operating levers connected to each sleeve and extending outwardly through slots formed in the surrounding sleeves for independently rotating said sleeves to actuate a desired signal; means formed upon the locking sleeve to engage the operating levers, whereby the signal may be held in signaling position; and means for moving the locking sleeve to release an operating lever engaged thereby.

3. In a vehicle direction indicator, a plurality of nested actuating sleeves each connected to a corresponding signal for actuating the same; a slidably movable locking sleeve mounted around the actuating sleeves; operating levers connected to each sleeve and extending outwardly through slots formed in the surrounding sleeves for independently rotating said sleeves to actuate a desired signal; means for preventing rotation of the locking sleeve with the actuating sleeves; and means formed upon the locking sleeve and arranged to engage the actuating levers for locking the same in signaling position.

4. In a vehicle direction indicator, a plurality of nested actuating sleeves, each connected to a corresponding signal for actuating the same; a slidably moving locking sleeve mounted around the actuating sleeves; operating levers connected to each sleeve and extending outwardly through slots formed in the surrounding sleeves for independently rotating said sleeves to actuate a desired signal; means for preventing rotation of the locking sleeve with the actuating sleeves; and means formed upon the locking sleeve and arranged to engage the operating levers for locking the same in signaling position, and means being arranged to displace the locking sleeve longitudinally, when a lever is moved to signaling position, to receive said operating lever into locked position and to release a previously engaged lever.

5. In a vehicle direction indicator, a plurality of nested actuating sleeves, each connected to a corresponding signal for actuating the same; a slidably movable locking sleeve mounted around the actuating sleeves; operating levers connected to each sleeve and extending outwardly through slot formed in the surrounding sleeves for independently rotating said sleeves to actuate a desired signal; means for preventing rotation of the locking sleeve with the actuating sleeves; and means formed upon the locking sleeve and arranged to engage the operating levers for locking the same in signaling position, said means being arranged to displace the locking sleeve longitudinally, when a lever is moved to signaling position, to receive said operating lever into locked position and to release a previously engaged lever; and means for moving the locking sleeve independently of a movement of said operating levers for releasing a lever engaged by said sleeve.

6. In a vehicle direction indicator, a plurality of nested actuating sleeves, each connected to a corresponding signal for actuating the same; a slidably moving locking sleeve mounted around the actuating sleeves; operating levers connected to the sleeves and extending outwardly through slots formed in the surrounding sleeves for independently rotating said sleeves to actuate a desired signal; means for preventing rotation of the locking sleeve with the actuating sleeves; a spring mounted in connection with the locking sleeve for normally moving the sleeve to locking position; and means formed upon the locking sleeve and arranged to be engaged by the operating levers for moving said sleeve longitudinally against the pressure of the spring and to engage and lock said levers in signaling position; and means for moving the locking sleeve to release an operating lever engaged thereby.

7. In a vehicle direction indicator, a plurality of nested actuating sleeves mountd upon the steering post of a vehicle; means connecting each sleeve with a corresponding signal for actuating the same; a locking sleeve slidably mounted around the actuating sleeves; operating levers connected to the actuating sleeves and extending outwardly through slots formed in the surrounding sleeves for independently rotating the sleeves to actuate a desired signal; means for preventing rotation of the locking sleeve with the actuating sleeves; a spring mounted in connection with the locking sleeve for normally moving the sleeve to locking position; and projections formed upon the locking sleeves within the slots formed to receive the operating levers, said projections having beveled faces arranged to displace the locking sleeve longitudinally against the pressure of the spring when a lever is moved to signaling position and a shoulder arranged to engage and lock said lever in said signaling position; the movement of the locking sleeve to admit an operating lever to signaling position, being adapted to release any other lever held in locking position.

8. In a vehicle direction indicator, a plurality of nested actuating sleeves, each connected to a corresponding signal for actuating the same; a locking sleeve mounted around the actuating sleeves; operating levers connected to each sleeve and extending outwardly through slots formed in the surrounding sleeves for independently rotating said sleeves to actuate a desired signal; and means formed upon the locking sleeve to engage the operating levers, whereby the signal may be held in signaling position; means for moving the locking sleeve to release an operating lever engaged thereby; and a longitudinally disposed extension formed upon the locking sleeve, whereby said sleeve may be moved independently of the operating levers to release any lever held thereby.

In witness whereof I hereunto set my signature.

ALFRED J. ALLARD.